US010715478B2

(12) United States Patent
Liao (10) Patent No.: US 10,715,478 B2
(45) Date of Patent: *Jul. 14, 2020

(54) EVENT-BASED COMMENT GROUPING FOR CONTENT ITEMS (71) Applicant: Google Inc., Mountain View, CA (US)

(72) Inventor: Tawei Liao, Zollikerberg (CH)

(73) Assignee: GOOGLE LLC, Mountain View, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 15/784,047

(22) Filed: Oct. 13, 2017

(65) Prior Publication Data

US 2018/0041463 A1 Feb. 8, 2018

Related U.S. Application Data

(63) Continuation of application No. 14/464,314, filed on Aug. 20, 2014, now Pat. No. 9,794,211.

(51) Int. Cl.
*H04L 12/58* (2006.01)
*G06F 16/951* (2019.01)
*G06F 16/176* (2019.01)
*G06Q 10/10* (2012.01)
*G06Q 50/00* (2012.01)

(52) U.S. Cl.
CPC ............ *H04L 51/32* (2013.01); *G06F 16/176* (2019.01); *G06F 16/951* (2019.01); *G06Q 10/10* (2013.01); *G06Q 50/01* (2013.01)

(58) Field of Classification Search
CPC ............ G06F 17/241; H04N 21/23418; G11B 27/034; G06Q 30/0241; H04L 51/32
See application file for complete search history.

(56) References Cited

U.S. PATENT DOCUMENTS 7,631,015 B2* 12/2009 Gupta .................. G06F 17/241
2005/0086354 A1* 4/2005 Orchard ........... H04N 21/23418
709/231
2010/0318520 A1 12/2010 Loeb et al.
(Continued)

OTHER PUBLICATIONS

USPTO, Office Action for U.S. Appl. No. 14/464,314, dated May 31, 2016.
(Continued)

*Primary Examiner* — Etienne P Leroux
(74) *Attorney, Agent, or Firm* — Lowenstein Sandler LLP (57) ABSTRACT

A method for event-based comment grouping for content items is disclosed. The method includes identifying, by a processing device, user comments corresponding to a content item, the user comments comprising playback timestamps having selectable links to access a portion of the content item that is associated with a respective time interval, dividing the content item into a plurality of content item segments that are associated with respective time intervals, grouping the user comments to associate with respective content item segments based on the playback timestamps of the user comments, selecting a content item segment of the content item segments based on interactions with the user comments, and providing a subset of the grouped user comments associated with the selected content item segment for display during playback of the content item.

22 Claims, 6 Drawing Sheets

(56) References Cited

U.S. PATENT DOCUMENTS

2011/0194839 A1\* 8/2011 Gebert ................. G11B 27/034
                                                             386/290
2012/0158492 A1\* 6/2012 Ye ...................... G06Q 30/0241
                                                            705/14.49
2013/0061263 A1    3/2013 Issa et al.

OTHER PUBLICATIONS

USPTO, Final Office Action for U.S. Appl. No. 14/464,314, dated Oct. 12, 2016.
USPTO, Office Action for U.S. Appl. No. 14/464,314, dated Dec. 12, 2016.
USPTO, Final Office Action for U.S. Appl. No. 14/464,314, dated Apr. 25, 2017.
USPTO, Notice of Allowance for U.S. Appl. No. 14/464,314, dated Jun. 15, 2017.

\* cited by examiner

Receive comments corresponding to a content item, the comments including timestamp information transformed into selectable links to access the indicated time of the selectable link during playback of the content item
310

Divide the content item into discrete time interval segments
320

Group received comments into the time interval segment based on the timestamp information of each comment
330

Determine popularity of each time interval segment based on user interaction with comments of each time interval segment
340

Select time interval segment for display based on the determined popularity of the time interval segments
350

Display comments corresponding to the selected time interval segment during playback of the content item
360

EVENT-BASED COMMENT GROUPING FOR CONTENT ITEMS

CROSS-REFERENCE TO RELATED APPLICATIONS

This patent application is a continuation of U.S. Non-Provisional application Ser. No. 14/464,314, filed Aug. 20, 2014, entitled "Event-Based Comment Grouping for Content Items," which is incorporated herein by reference for all purposes.

TECHNICAL FIELD

This disclosure relates to the field of content sharing platforms and, in particular, to event-based comment grouping for content items.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Currently, when a user is viewing a content item of the content sharing platform, the user may comment on the content item. Writing comments corresponding to a content item is the primary way for users to communicate back to the creator of the content item. Comments also allow users to communicate with each other around a specific topic (e.g., such as the content item in question). When there are hundreds or thousands of comments, it becomes very difficult to find good or relevant comments.

There are many existing approaches to sorting, ranking, and showing the comments that are relevant to a user. For example, individual comments can have "up" and "down" buttons to allow users to vote on other user's comments in order to show the most "up"-voted comments at the top of a comments section. Another technique is to show the comments from people in a user's social network at the top. One other common approach is to display the comments from highly-reputable users at the top of the comments section. Reputation may be acquired based on tenure, the number of "up" votes, the number of comments, votes given by other users, and a wide variety of other factors.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for event-based comment grouping for content items is disclosed. The method includes identifying comments corresponding to a content item, the comments comprising playback timestamp information transformed into selectable links to access a corresponding portion of the content item during playback of the content item, dividing the content item into a plurality of time interval segments, grouping the received comments into the time interval segments based on the playback timestamp information of each comment, selecting a time interval segment of the time interval segments, and providing comments corresponding to the selected time interval segment for display during playback of the content item.

In one implementation, the method further includes the dividing the content item into a plurality of time interval segments being based on at least one of a length of the content item, a number of comments that fall within a time range of the content item, or a minimum time interval length. In addition, the minimum time interval length may be configured by an administrator of a content sharing platform hosting the content item. In another implementation, the playback timestamp information corresponds to a location in a timeline of the content item playback.

In one implementation, the grouping of the received comments further includes placing each comment into the time interval segment comprising a time of the corresponding portion of the content item during playback of the content item. Furthermore, providing the comments may further include placing the comments corresponding to the selected time interval segment in association with a media player in a graphical user interface (GUI) of the content item. In some implementations, the selecting the time interval segment is based on a popularity of the time interval segment according to interactions with the comments of the time interval segments.

In other implementations, the popularity of a time interval segment is based on at least one of votes for the comments of the time interval segment, likes of the comments of the time interval segment, number of views of the comments of the time interval segment, number of comments within a time interval segment, or sharing of comments of the time interval segment. In addition, the method may further include selecting a promotion for display during the selected time interval segment that is most popular.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for event-based comment grouping for content items. In implementations of the disclosure, a comment sharing component of a content sharing platform provides a feature to group and display comments corresponding to a content item based on playback timestamp information included in the comments. In implementations of the disclosure, the comment sharing component may divide a content item into discrete interval segments and group comments containing time stamp information into their respective interval segments. Comments grouped within a specified interval may be further sorted using existing approaches (e.g., chronologically, vote count, social network attribution, reputation of commenter, combination of the above, etc.). The comment sharing component may also determine which interval segment to select for displaying the corresponding comments upon content item playback. In further implementations, the comment clustering may also be utilized to inform promotion selection and display during the content item playback.

Implementations of the disclosure have a different layer of granularity than previous solutions for event-based comment clustering for content items. Previously, content sharing platforms allowed for playback time stamp information to be included within a comment on a content item. The playback time stamp information references a discrete point in time in the playback of the content item corresponding to the comment. However, content sharing platforms did not use playback time stamp information that references a discrete point in time in the playback of the content item for the sorting, organization, and/or display of comments corresponding to a content item.

Implementations of the disclosure improve the commenting systems for content item playback by grouping and displaying comments for a content item based on the time stamp information included with the comments. Grouping comments based on time stamps and displaying the grouped comments is useful because the users of the platform are informing the platform of the portions of the content item that they particularly like (or dislike) (i.e., by indicating the time stamp information in the comments). As a result, the event-based comment clustering for content items described herein may help promote the creation of high-quality comments by better displaying relevant and/or popular comments to the user. As such, implementations of the disclosure may increase user engagement for a content sharing platform.

Figure 1:
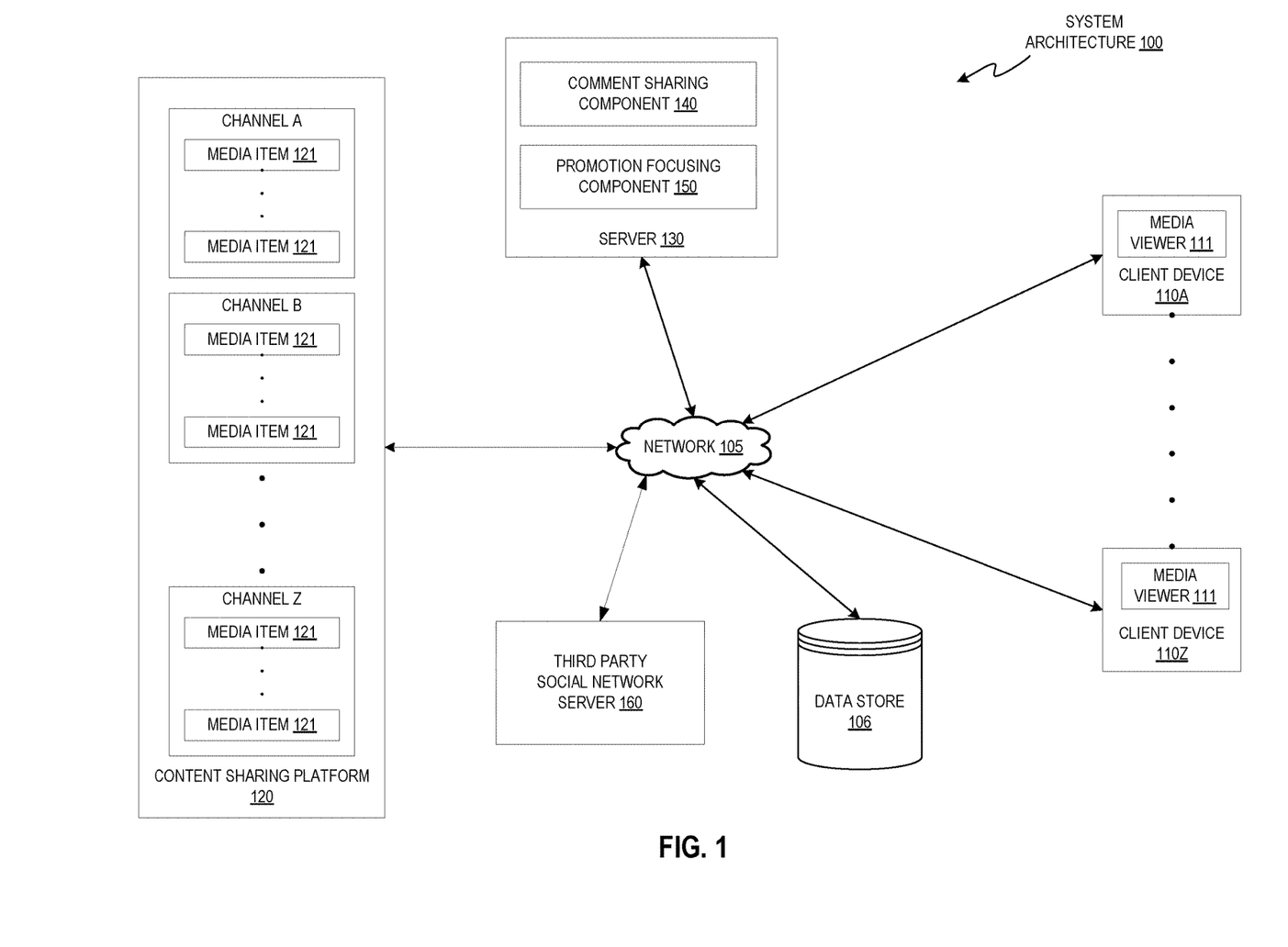
FIG. 1 illustrates an example system architecture, in accordance with one implementation of the disclosure.

FIG. 1 illustrates an example system architecture 100, in accordance with one implementation of the disclosure, for navigation of a list of content sharing platform media items on a client device via gesture controls and contextual synchronization. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or otherwise comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a comment sharing component 140 and a promotion focusing component 150. The comment sharing component 140 enables grouping and displaying of comments based on playback time-stamp information included in the comments. As discussed above, the playback time stamp information references a discrete point in time in the playback of the content item corresponding to the comment. The promotion focusing component 150 may provide information selection and display of promotions during playback of the content item based on the grouping of comments by the comment sharing component 140.

More specifically, in implementations of the disclosure, the comment sharing component 140 may divide a content item into discrete interval segments and group comments containing time stamp information into their respective interval segments. Comments grouped within a specified interval may be further sorted using existing approaches (e.g., chronologically, vote count, social network attribution, reputation of commenter, combination of the above, etc.). The comment sharing component 140 may also determine which interval segment to select for displaying the corresponding comments upon content item playback.

In further implementations, the comment grouping may also be utilized by the promotion focusing component 150 as in input in the selection of promotions to display during playback of the content item. For example, a promotion may be selected for placement during a time interval segment including comments that are determined to be most popular (in comparison to comments from the other time interval segments) (e.g., based on user interactions with the comments, such as votes, selections, viewing, sharing, etc.). A promotion may refer to a form of communication used to offer or encourage an audience (e.g., users, viewers, readers or listeners; sometimes a specific group) to take or continue to take some action.

In some implementations, comment sharing component 140 and promotion focusing component 150 of server 130 may interact with content sharing platform and/or with other third party social network servers 160 to provide implementations of the disclosure. Further description of the comment sharing component 140, promotion focusing component 150, and their specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed herein collect personal information about users, or may make use of personal information, the users may be provided with an opportunity to control whether the content sharing platform 120 can collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
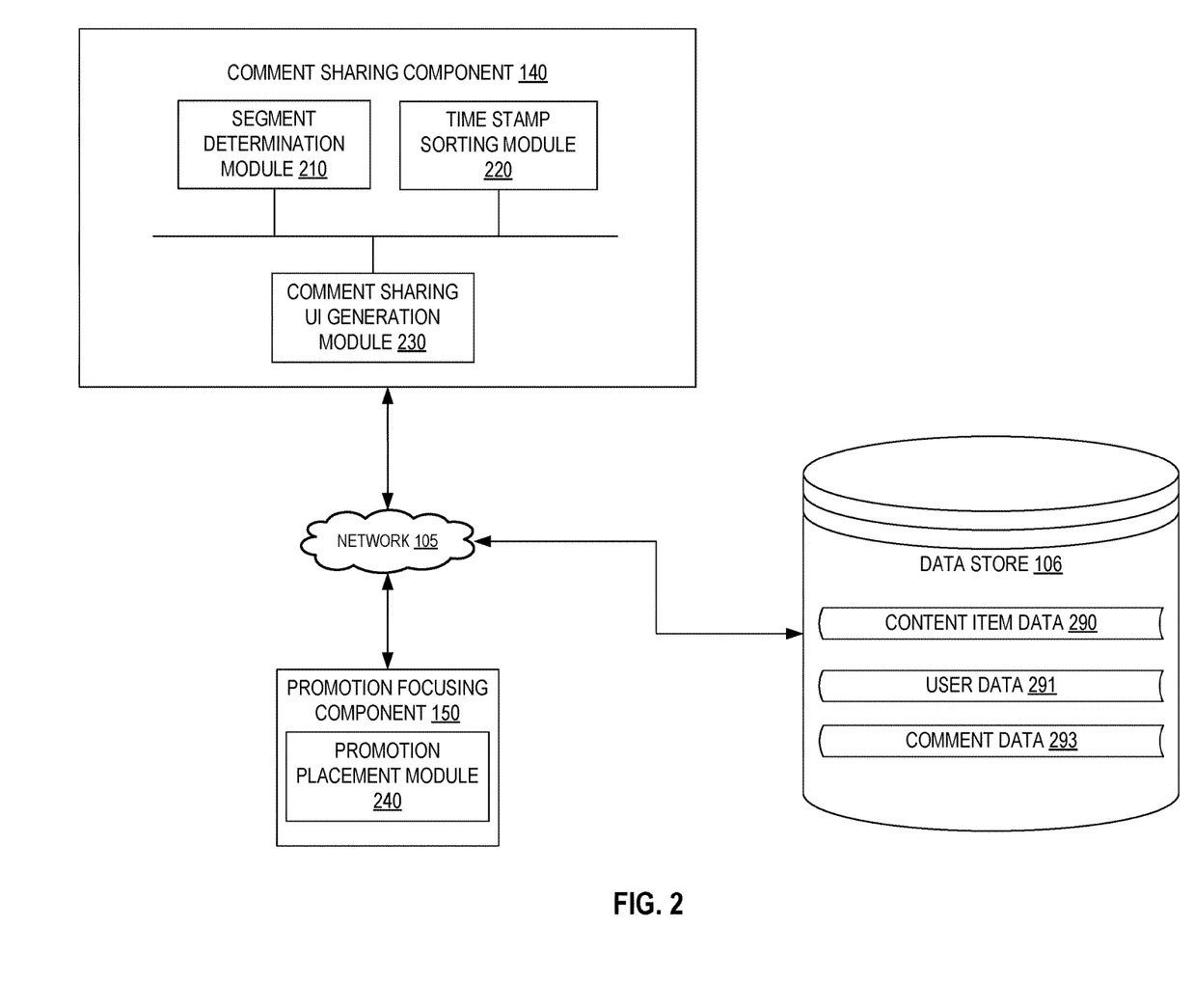
FIG. 2 is a block diagram illustrating a comment sharing component in accordance with one implementation of the disclosure.

FIG. 2 is a block diagram illustrating a comment sharing component 140 and a promotion focusing component 150 in accordance with one implementation of the disclosure. In one implementation, the comment sharing component 140 includes a segment determination module 210, a time stamp sorting module 220, and a comment sharing UI generation module 230. The promotion focusing component 150 may include a promotion placement module 240. More or less components may be included in the comment sharing component 140 and/or the promotion focusing component 150 without loss of generality. For example, two of the modules may be combined into a single module, or one of the modules may be divided into two or more modules. In one implementation, one or more of the modules may reside on different computing devices (e.g., different server computers).

The comment sharing component 140 and the promotion focusing component 150 are communicatively coupled to the data store 106. For example, the comment sharing component 140 and/or the promotion focusing component 150 may be coupled to the data store 106 via a network (e.g., via network 105 as illustrated in FIG. 1). In another example, the comment sharing component 140 and/or the promotion focusing component 150 may be coupled directly to a server where the comment sharing component 140 and/or the promotion focusing component 150 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, and comment data 292.

As discussed above, the comment sharing component 140 enables grouping and displaying of comments based on time-stamp information included in the comments. A time stamp may refer to a parameter that indicates a discrete or distinct location within a playback timeline of a content item (e.g., 23:02, 13m4s, etc.) and/or to a time range within the content item (e.g., "12 minutes 30 seconds to 13 minutes 5 seconds").

In one implementation, when a commenting user accesses and watches a content item from the content sharing platform, an option to comment on the content item is provided by the content sharing platform. In one implementation, the comment sharing UI generation module 230 may provide the option to comment. In other implementations, already-existing commenting functionality of the content item GUI may be utilized to receive comments on the content item from the commenting user. The commenting user may select a commenting icon or other commenting indicator to input his or her comment regarding the content item.

When a user calls out a discrete point in time in the playback of the content item as part of a comment, the content sharing platform may transform the text indicating the discrete point in time into a selectable link (e.g., a reference in an electronic document that lets a user display or activate another document or program) that is displayed as part of the comment. Data indicating user feedback for the comment, the timestamp, and the selectable link associated with the timestamp may be stored as comment data 293 in data store 106. When any user selects the link, the content item is played starting at the distinct location corresponding to the selectable link. The other text of the comment is typically referring to the subject matter occurring at the indicated location of the time stamp.

When time stamp information is provided and transformed into a link in a comment, this information can be used by implementations of the disclosure to group and display the comments. In one implementation, the segment determination module 210 divides a content item into discrete time interval segments. For example, a content item may be divided into segments A, B, C, and D and all comments that contain time stamp information are first grouped into their respective interval segments A, B, C, and D. In one implementation, the length of the intervals can be fixed. When there are not that many comments with time stamps, a content item may be divided into fixed two minute intervals (as an example). In other implementations, the length of the intervals can also be computed dynamically using the following information as parameters: the length of the content item, the number of comments which fall within a time range, and the minimum interval length, for example. Other parameters may also be used to determine interval length selection. Data associated with the segmenting of a content item for comment grouping purposes may be stored in content item data 290 and/or comment data 293 of data store 106.

A goal of choosing an appropriate time interval length is to allow a viewer of the content item to read the comments that fall within the same time interval (e.g., grouping the comments such that comments about a specific scene are displayed). If the content item is very short (e.g., under 1 minute), the content item may not be divided into segments. In this case, all of the time-stamped comments are in the one and only interval.

The minimum interval length may be a configurable parameter. All segments can be configured with a same minimum length. In some implementations, the minimum length is derived through experimentation. If it is determined that grouping the comments using a two-minute minimum interval results in more selection and viewing of the comments and more responses to the comments than using a four minute minimum interval, then the two-minute minimum should be used.

On the other hand, if there are hundreds of comments with a large minimum interval, the valuable comments that can drive user engagement can get "lost" and therefore result in lower user engagement. Using a smaller minimum interval length can result in grouping the comments with finer granularity and have a smaller working set of comments to rank. However, that can also result in displaying comments for a scene in the video in which the user is not interested in.

Once the content item is separated into discrete time intervals, the time stamp sorting module 220 may then group comments containing time stamp information into their respective interval segments. That is, if the content item is divided into segments, A, B, C, D where A is 0:00-2:00, B is 2:01-5:00, C is 5:01-8:00, and D is 8:01-13:00, those comments having timestamps falling from 0:00-2:00 are grouped into segment A, and so on. The comments within a specified interval segment may further be sorted and grouped using other existing approaches. For example, comments within a time interval segment may be sorted based on chronological or reverse chronological order, "up" vs "down" vote count, social media friend or circle information, reputation of the commenter, and any combination of above, for example. Data associated with the grouping of a content item for comment grouping purposes may be stored in comment data 293 of data store 106, for example.

The comment sharing UI generation module 230 may select which interval segment to display the corresponding comments upon content item playback. Comments may be shown to a user one interval at a time. There are many ways of showing the grouped comments. The grouped comments do not have to be shown in chronological order. In addition, grouped comments in a particular segment may or may not be shown while the content item is playing that particular segment.

In some implementations, a comment segment to display during playback of a content item may be based on popularity of comments within the segments. In some implementations, the viewing user may be provided an option to respond to, indicate favorability (e.g., like, +1, etc.), and/or share the comment. These options may be shown as hyperlinks or other selection icons as part of the displayed comment UI. "Popularity" may be based on a variety of factors including, but not limited to, votes, likes, number of views (selections), number of comments within a segment, and so on.

For example, a segment having the most voted-for (e.g., "liked") may be selected for display during playback of the content item. As such, if segment D corresponds to the most popular comments, then comments from segment D may be shown even while the content item is currently playing segments A, B, or C. By displaying the popular comment group, implementations may engage the viewing user by showing relevant comments so that the user may select ahead on the timestamp link and watch that segment if he or she chooses.

On the other hand, implementations of the disclosure may vary the cluster segment that is selected for viewing without regard to popularity of the comment in that segment. Always showing the comments from the most popular comment group may not be beneficial in every case, as the popular comments get more popular while other comments may get "lost". As such, in some implementations, popular comment segments may be shown more often to some users, while other users may see comment segments that are not as popular so that it can be determined if comments in those segments can become popular as well.

In further implementations, the comment clustering may also be utilized by promotion focusing component 150 for promotion selection and display during the content item playback. The comment grouping segments and popularity statistics of comments within a segment may be used as a parameter for promotion focusing within a content item. In some implementations, a promotion may be displayed during playback of a content item. The promotion placement module 240 may utilize the information about the popularity of each time interval segment to select a segment to display a promotion during playback of the content item. If there are comments during a particular segment that are driving user engagement (e.g., because users select the time stamp link in the comments to jump to that portion of the content item, or because users "up"-vote comments in that segment, etc.), the promotion placement module 240 may generate a signal to place a promotion during that segment of the content item.

In some implementations, event-based comment clustering for a content item as described above is performed in the context of content item streaming to a mobile device that is executing a content sharing platform application specifically designed for playback of the content item.

Figure 3:
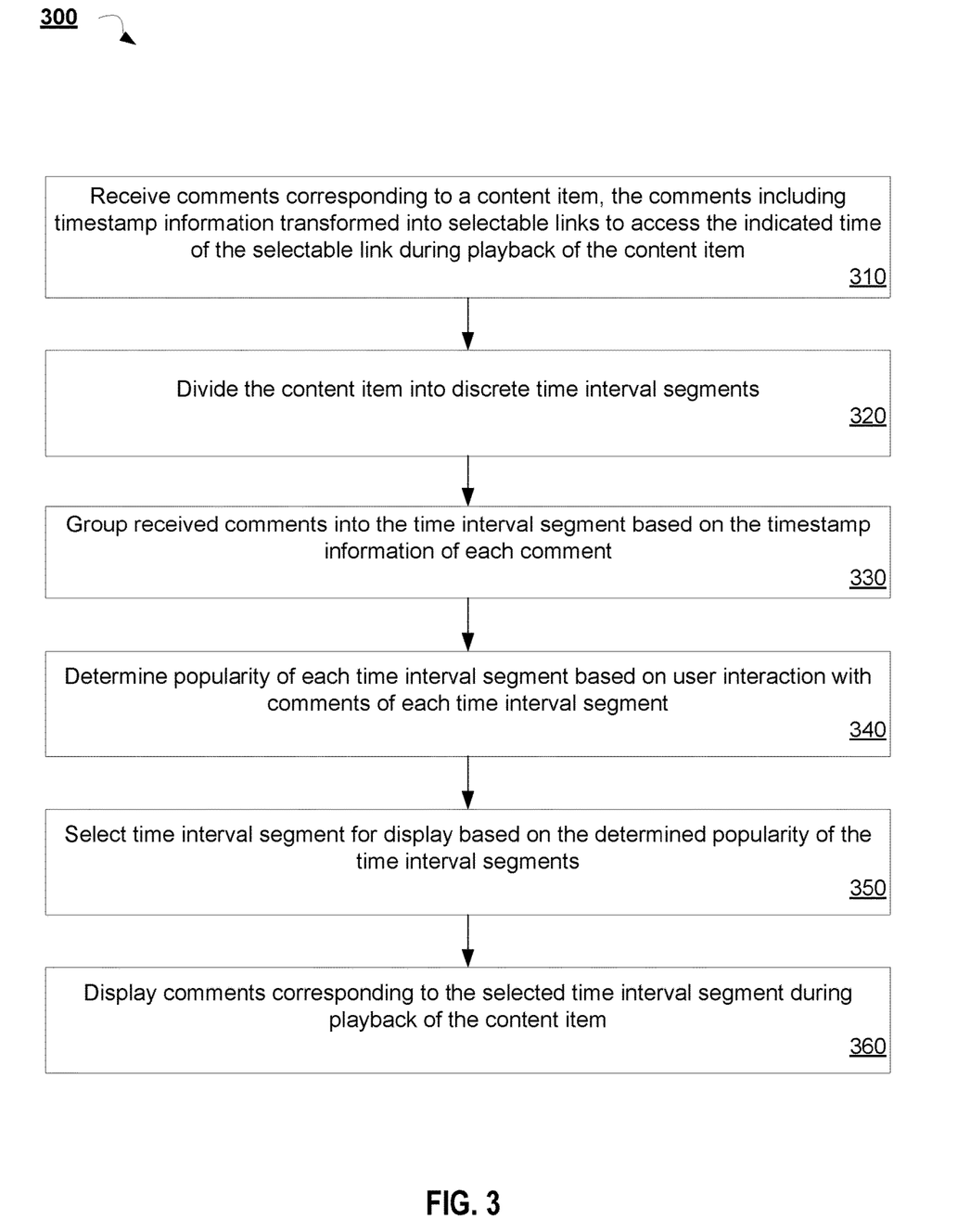
FIG. 3 is a flow diagram illustrating a method for event-based comment grouping for a content item, according to some implementations of the disclosure.

FIG. 3 is a flow diagram illustrating a method 300 for event-based comment clustering according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by comment sharing component 140 as shown in FIGS. 1 and 2.

Referring to FIG. 3, at block 310, method 300 begins at block 310 when comments corresponding to a comment item are received. In one implementation, the comments include timestamp information that is transformed into selectable links to access the indicated time of the selectable link during playback of the content item. At block 320, the content item is divided into discrete time interval segments. The time interval segments may be determined based on one or more of the length of the content item, the number of comments with fall within a time range, or the minimum interval length. The minimum time interval length may be configured by an administrator of a content sharing platform hosting the content item.

At block 330, the received comments are grouped into the time interval segments based on the timestamp information of each comment. For example, all comments with timestamp information occurring during a particular time interval segment are grouped into that time interval segment. Subsequently, at block 340, a popularity of each time interval segment is determined based on the user interactions with comments of each time interval segment. In one implementation, popularity of a time interval segment is based on at least one of votes, likes, number of views (selections), number of comments within a segment, sharing of comments, and so on.

At block 350, the time interval segment that is determined to be most popular is selected for display. In other implementations, a random time interval segment may be selected without consideration of popularity. Lastly, at block 360, comments of the selected time interval segment are displayed during playback of the content item.

Figure 4:
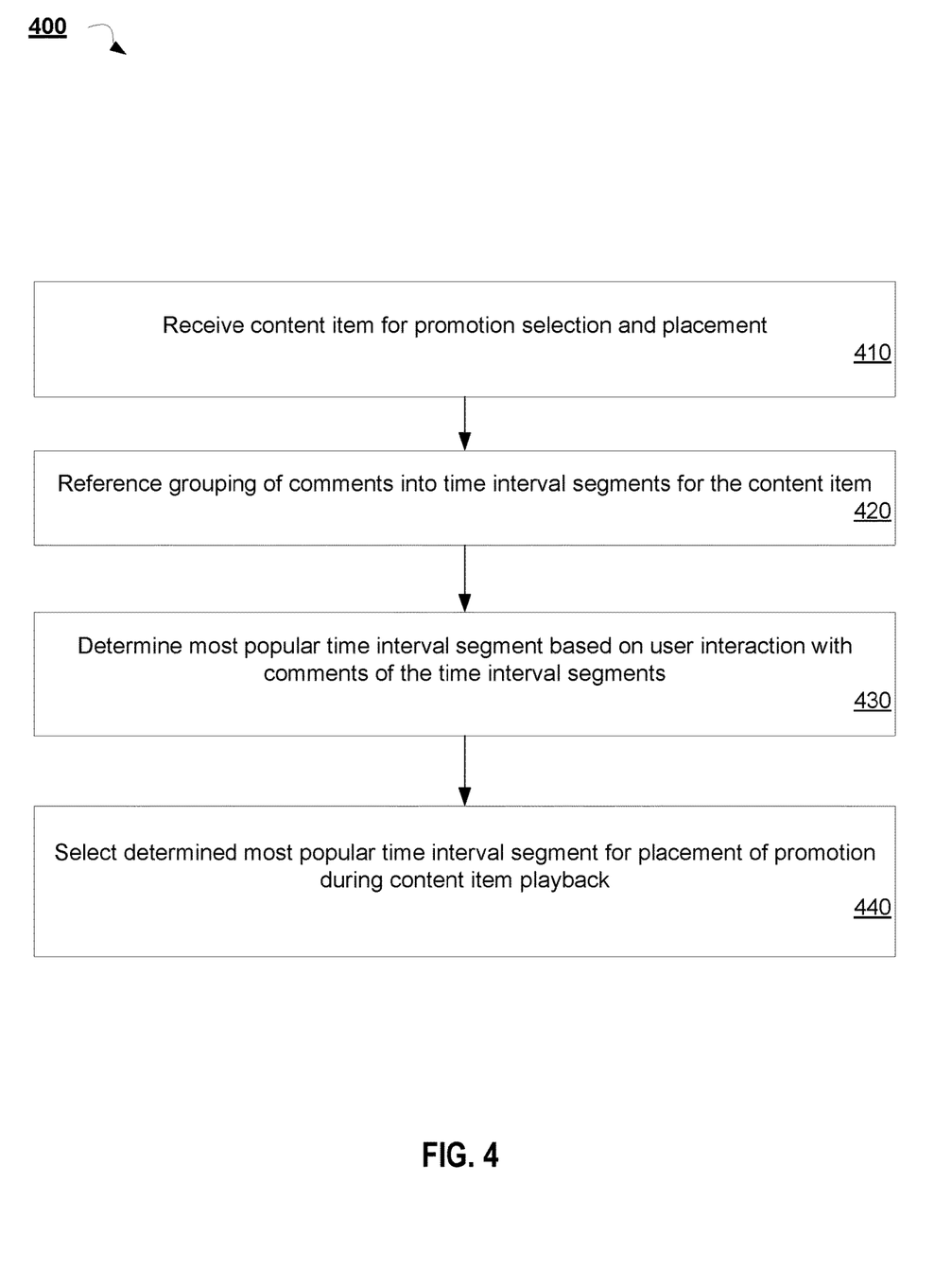
FIG. 4 is a flow diagram illustrating a method for promotion focusing based on event-based comment grouping, according to some implementations of the disclosure.

FIG. 4 is a flow diagram illustrating another method 400 for promotion focusing based on event-based comment clustering, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by comment sharing component 140, as shown in FIGS. 1 and 2.

Referring to FIG. 4, at block 410, method 400 begins at block 410 when a content item is identified for promotion selection and placement. Then, at block 420, a grouping of comments (of the content item) into time interval segments is referenced. In one implementation, the grouping is performed according to method 300 of FIG. 3 described above.

Subsequently, at block 430, a most popular time interval segment of the content item is determined. In one implementation, the most popular time interval segment is based on user interactions with the comments of the time interval segments. For example, popularity of a time interval segment may be based on at least one of votes for a comment, likes for a comment, number of views (selections), number of comments within a segment, sharing of comments, and so on. Lastly, at block 440, a determined most popular time interval segment is selected for placement of a promotion during subsequent playback of the content item.

Figure 5:
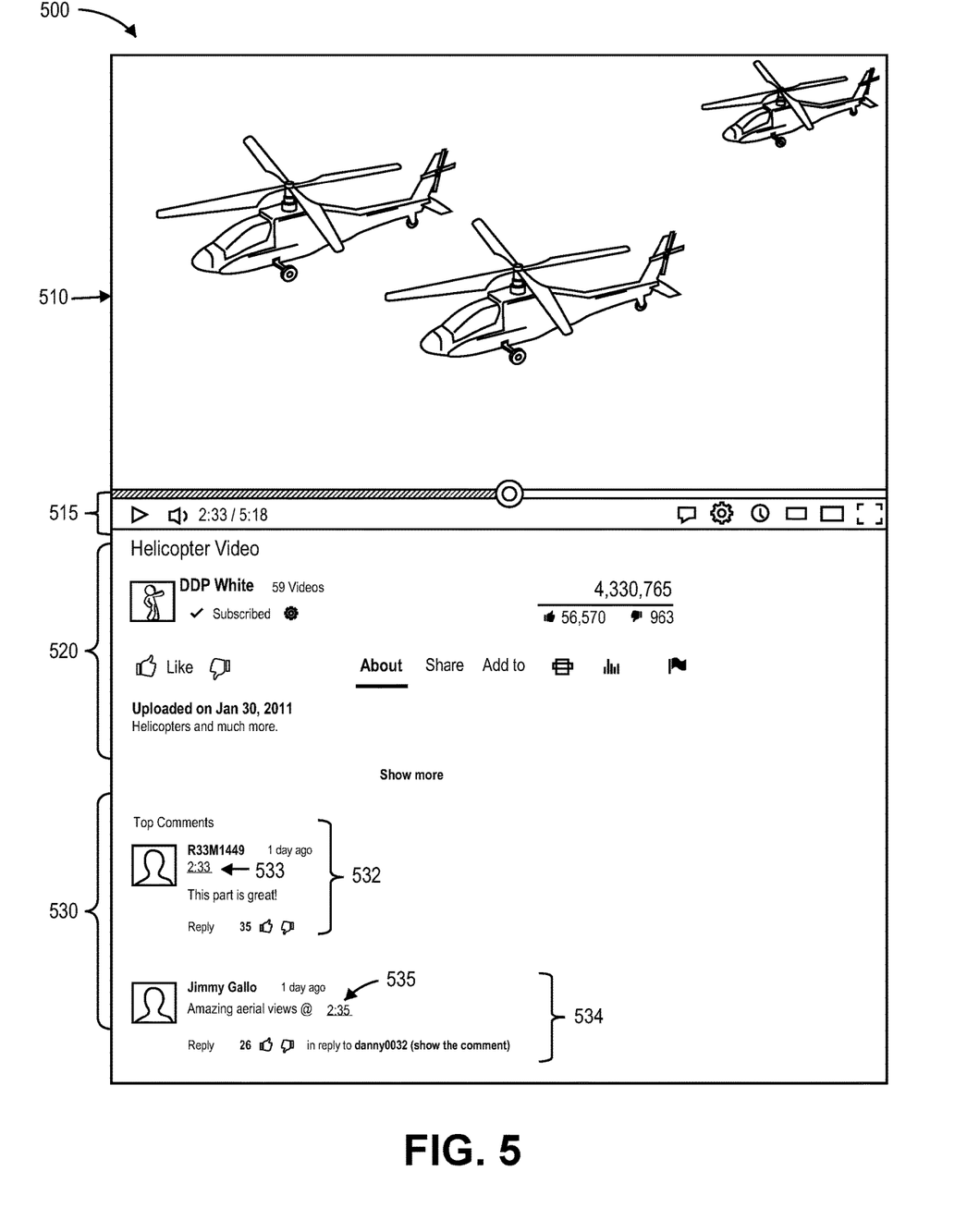
FIG. 5 is an example screenshot illustrating a content item playback UI with event-based comment grouping of a content item, according to an implementation of the disclosure.

FIG. 5 illustrates an example screenshot of a content item playback UI 500 with event-based comment grouping of a content item, according to an implementation of the disclosure. The content item playback UI 500 may be provided to a user viewing a content item via a media player 510 at a client device. The content item playback UI 500 includes the media player 510 playing back the content item and a content item information section 520. The media player 510 may include a playback control bar 515 providing a timeline of the content item indicating where a user is during playback of the content item and controls to control playback of the content item (e.g., stop, pause, volume, etc.).

Content item information section 520 may detail identifying information of a currently-accessed content item shown in media player 510. The content item information section 520 may include, but is not limited to, information such as a title of the content item, content owner of the content item, posting date of the content item, duration of the content item, number of views of the content item, number of "likes" (e.g., thumbs up) of the content item, number of "dislikes" (e.g., thumbs down) of the content item, and so on.

In one implementation, the comment item playback UI 500 includes a comment section 530. The comment section 530 may be part of the media player 510. As shown in FIG. 5, the comment section 530 is located below the content item information section 520.

In one implementation, the comments section 530 displays comments corresponding to a time interval segment grouping of the content item. For example, assume the content item shown in FIG. 5 is divided into three time interval segments: segment A from 0:00 to 2:00, segment B from 2:01 to 4:00, and segment C from 4:01 to 5:15. Using implementations described above, comments associated with the content item and including timestamp information may be grouped into the discrete time interval segments. The comments in one of the discrete time interval segments are selected for display in the comments section 530 during playback of the content item.

As shown in FIG. 5, the comments section 530 includes two comments, 532, 534 including timestamp information (e.g., selectable links) 533, 535. The timestamp information 533, 535 may include selectable links pointing to a particular time occurring in the playback of the content item. If a user selects the time stamp information 533, 535 within a comment 532, 534, the playback of the content item jumps to that corresponding time in the playback of the content item.

Both comments 532, 534 include timestamp information 533, 535 occurring during time interval segment B. This indicates that time interval segment B was selected for comment display during playback of the content item. As discussed above, this selection of time interval segment B may be based on popularity of the comments (as based on user interactions with the comments) within time interval segment B (as compared to the other comments in the other time interval segments of the content item). Other locations and configurations of the comments section 530 other than those described with respect to content item playback UI 500 may also be utilized in implementations of the disclosure.

Figure 6:
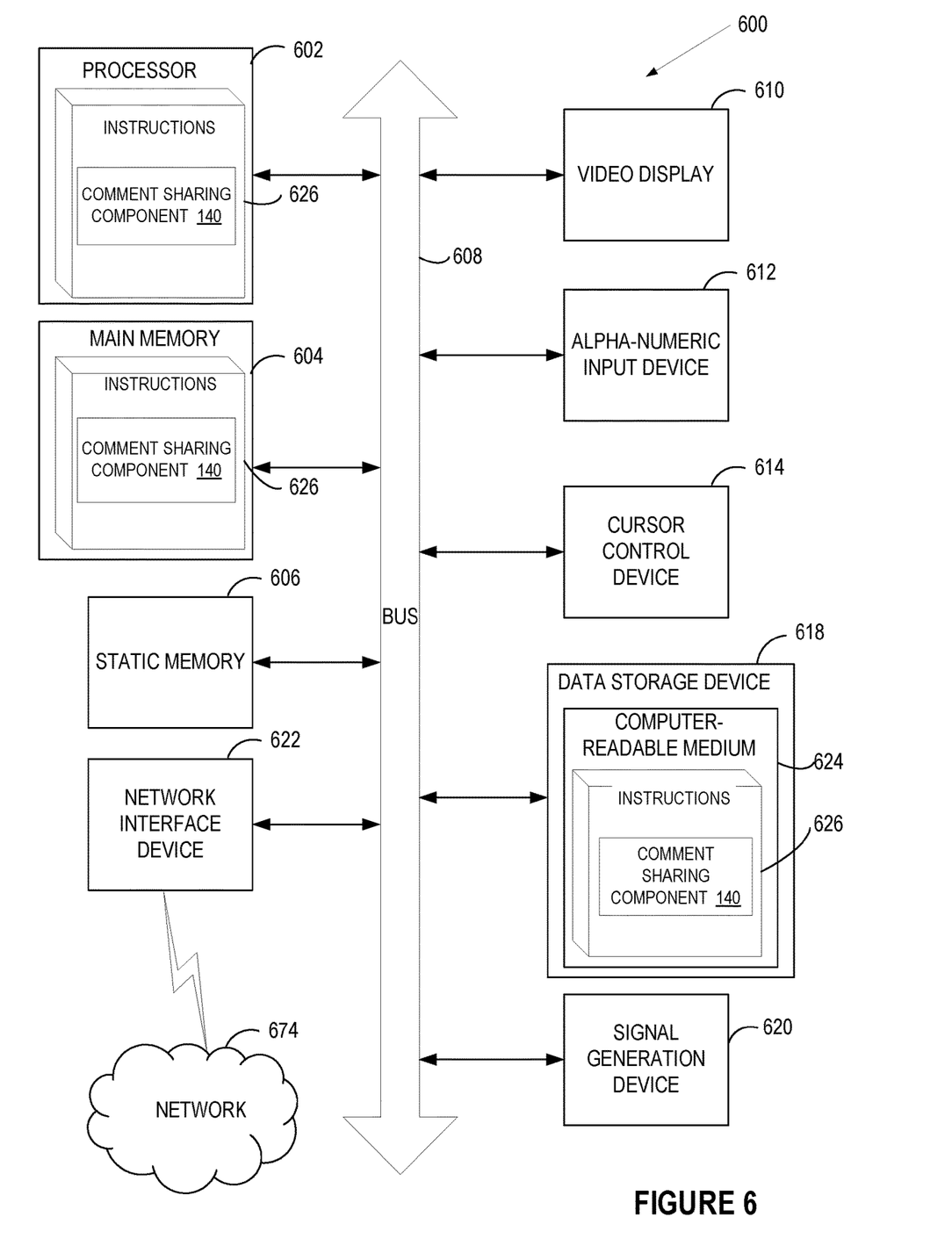
FIG. 6 is a block diagram illustrating an exemplary computer system, according to some implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for a comment sharing component 140, which may correspond, respectively, to their identically-named counterparts described with respect to FIGS. 1 and 2, and/or a software library containing methods that call a comment sharing component for event-based comment grouping for a content item. While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium"

shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    identifying, by a processing device, user comments corresponding to a content item, the user comments comprising playback timestamps having selectable links to access a portion of the content item that is associated with a respective time interval;
    dividing the content item into a plurality of content item segments that are associated with respective time intervals;
    grouping the user comments to associate with respective content item segments based on the playback timestamps of the user comments;
    selecting a content item segment of the content item segments based on interactions with the user comments; and
    providing a subset of the grouped user comments associated with the selected content item segment for display during playback of the content item.

2. The method of claim 1, wherein lengths of the content item segments are dynamically determined based on a minimum time interval length that is configured by an administrator of a content sharing platform hosting the content item.

3. The method of claim 1, wherein each of the playback timestamps correspond to a location in a timeline of the content item.

4. The method of claim 1, wherein the grouping further comprises placing each of the user comments into the respective content item segment comprising a time of a corresponding portion of the content item during playback of the content item.

5. The method of claim 1, wherein providing the subset further comprises placing the user comments corresponding to the selected content item segment in association with a media player in a graphical user interface (GUI) of the content item.

6. The method of claim 1, wherein the selecting the content item segment is based on a popularity of the content item segment according to the interactions with the user comments of the content item segments.

7. The method of claim 6, wherein the popularity of the content item segment is based on at least one of votes for the user comments of the content item segment, likes of the user comments of the content item segment, number of views of the user comments of the content item segment, number of the user comments within the content item segment, or sharing of the user comments of the content item segment.

8. The method of claim 6, further comprising selecting a promotion for display during the selected content item segment that is most popular.

9. An apparatus comprising:
a display device;
a memory communicably coupled to the display device; and
a processing device communicably coupled to the memory, the processing device to execute instructions to:
identify user comments corresponding to a content item, the user comments comprising playback timestamps having selectable links to access a portion of the content item that is associated with a respective time interval;
divide the content item into a plurality of content item segments that are associated with respective time intervals;
group the user comments to associate with respective content item segments based on the playback timestamps of the user comments;
select a content item segment of the content item segments based on interactions with the user comments; and
provide a subset of the grouped user comments associated with the selected content item segment for display during playback of the content item.

10. The apparatus of claim 9, wherein each of the playback timestamps correspond to a location in a timeline of the content item playback.

11. The apparatus of claim 9, wherein the processing device to group the user comments further comprises the processing device to place each of the user comments into the respective content item segment that comprises a time of a corresponding portion of the content item during playback of the content item.

12. The apparatus of claim 9, wherein the processing device to provide the subset further comprises the processing device to place the user comments corresponding to the selected content item segment in association with a media player in a graphical user interface (GUI) of the content item.

13. The apparatus of claim 9, wherein the processing device to select the content item segment is based on a popularity of the content item segment according to the interactions with the user comments of the content item segments, and wherein the popularity of the content item segment is based on at least one of votes for the user comments of the content item segment, likes of the user comments of the content item segment, number of views of the user comments of the content item segment, number of the user comments within the content item segment, or sharing of the user comments of the content item segment.

14. The apparatus of claim 9, wherein the processing device further to select a promotion for display during the selected content item segment that is most popular.

15. A non-transitory machine-readable storage medium storing instructions which, when executed, cause a processing device to perform operations comprising:
identifying, by the processing device, user comments corresponding to a content item, the user comments comprising playback timestamps having selectable links to access a portion of the content item that is associated with a respective time interval;
dividing the content item into a plurality of content item segments that are associated with respective time intervals;
grouping the user comments to associate with respective content item segments based on the playback timestamps of the user comments;
selecting a content item segment of the content item segments based on interactions with the user comments; and
providing a subset of the grouped user comments associated with the selected content item segment for display during playback of the content item.

16. The non-transitory machine-readable storage medium of claim 15, wherein grouping the user comments further comprises placing each of the user comments into the respective content item segment that comprises a time of a corresponding portion of the content item during playback of the content item.

17. The non-transitory machine-readable storage medium of claim 15, wherein providing the subset further comprises placing the user comments corresponding to the selected content item segment in association with a media player in a graphical user interface (GUI) of the content item.

18. The non-transitory machine-readable storage medium of claim 15, wherein selecting the content item segment is based on a popularity of the content item segment according to the interactions with the user comments of the content item segments, and wherein the popularity of the content item segment is based on at least one of votes for the user comments of the content item segment, likes of the user comments of the content item segment, number of views of the user comments of the content item segment, number of the user comments within the content item segment, or sharing of the user comments of the content item segment.

19. The non-transitory machine-readable storage medium of claim 15, further comprising selecting a promotion for display during the selected content item segment that is most popular.

20. A method comprising:
receiving, by a processing device, a content item for playback to a viewing user;
receiving, by the processing device, a comment section to display in conjunction with the playback of the content item, wherein the comment section comprises user comments having playback timestamps comprising selectable links to access a portion of the content item that is associated with a respective time interval, and wherein the content item comprises a plurality of content item segments associated with respective time intervals of the content item and respective comment sections associated with the plurality of content item segments; and
displaying, during the playback of received content item, the comments section to the viewing user, wherein the comments section is selected from the plurality of comment sections based on a popularity of a corresponding content item segment according to interactions with the user comments of the corresponding content item segment.

21. The method of claim 20, wherein the popularity of the content item segment is based on at least one of votes for the user comments of the content item segment, likes of the user comments of the content item segment, number of views of the user comments of the content item segment, number of the user comments within the content item segment, or sharing of the user comments of the content item segment.

22. The method of claim 20, further comprising displaying, during the playback of the content item segment, a promotion that is most popular.

\* \* \* \* \*